United States Patent [19]

Curtis, Jr. et al.

[11] Patent Number: 5,016,832

[45] Date of Patent: May 21, 1991

[54] METHOD AND APPARATUS FOR WINDING AN AMORPHOUS MAGNETIC TOROIDAL TRANSFORMER CORE

[75] Inventors: Joe E. Curtis, Jr.; Douglas Burns, both of Lexington; John E. Cloyd, Versailles, all of Ky.

[73] Assignee: Kuhlman Corporation, Lexington, Ky.

[21] Appl. No.: 533,960

[22] Filed: May 30, 1990

Related U.S. Application Data

[63] Continuation of Ser. No. 396,487, Aug. 21, 1989, abandoned.

[51] Int. Cl.⁵ ..................... B65H 19/30; B65H 23/10; H02K 15/04

[52] U.S. Cl. .................................... 242/58.6; 29/605; 242/7.03; 242/64; 242/67.30 R; 242/75.2

[58] Field of Search ....................... 242/58.6, 79, 75.2, 242/64, 67.3 R, 7.03; 226/195; 29/605, 606, 609

[56] References Cited

U.S. PATENT DOCUMENTS

| | | | |
|---|---|---|---|
| 1,984,778 | 12/1934 | Tross | 242/78 |
| 2,245,180 | 6/1941 | Boyajian | 242/4 |
| 2,492,713 | 12/1949 | Roy | 242/65 |
| 3,258,212 | 6/1966 | La Tour | 242/55 |
| 3,380,686 | 4/1968 | Gaudin | 242/75.2 |
| 4,145,014 | 3/1979 | Chatard et al. | 242/83 |
| 4,416,426 | 11/1983 | Cooper | 242/64 X |
| 4,512,824 | 4/1985 | Taub | 29/605 X |
| 4,648,929 | 3/1987 | Siman | 29/609 X |
| 4,741,484 | 5/1988 | Curtis, Jr. | 242/703 |

*Primary Examiner*—Daniel P. Stodola

*Assistant Examiner*—William G. Battista, Jr.

*Attorney, Agent, or Firm*—Townsend and Townsend

[57] ABSTRACT

A continuous ribbon of annealed amorphous magnetic core material (4) is removed from a supply spool (14) and wound into an annular cavity (6) defined by a rotating bobbin (8) within a partially assembled toroidal transformer (10). An appropriate tension on the material entering the annular cavity is created by providing a magnet (35) along a guide surface (20) between the supply spool and the annular cavity to create a drag force on the material. Slack in the material between the guide surface and the entrance gap is eliminated by lightly biasing (40) a portion of the guide surface against the core material. The amorphous magnetic core material is preferably subjected to a stress relief annealing operation in the same spiral orientation and with the same inner and outer diameters as the material will assume as the core of the toroidal transformer. To accomplish this the annealed core material is backwound from its annealing spool (44) onto the supply spool and then is wound into the bobbin. The annealing process makes the thin amorphous material quite brittle so that extra care must be taken to keep from damaging the edges. Accordingly, no edge guides are used along the path of the core material from the supply spool to the entrance gap.

28 Claims, 1 Drawing Sheet

METHOD AND APPARATUS FOR WINDING AN AMORPHOUS MAGNETIC TOROIDAL TRANSFORMER CORE

This is a continuation of application Ser. No. 396,487, filed Aug. 21, 1989, now abandoned.

BACKGROUND OF THE INVENTION

The technology exists for winding lengths of uncut magnetic core material into a partially assembled toroidal transformer. One such system is shown in U.S. Pat. No. 4,741,484 issued May 3, 1988, the disclosure of which is incorporated by reference. The process used is illustrated best in FIGS. 42 and 47 of the patent. This technology has been developed for use with rolls of uncut crystalline, grain oriented silicon steel typically about 0.18 to 0.30 mm thick.

Recently great advances have been made in amorphous (non-crystalline) magnetic alloys for use as the core material for transformers. These amorphous materials are substantially more efficient than the best silicon magnetic steel alloys. Amorphous transformer core materials can be purchased from Allied-Signal Corp. of Morristown. N. J.

Amorphous core material which is to be wound into a partially assembled toroidal transformer is commonly supplied to the user on very large rolls. The material on these large rolls is then wound onto spools by the user. The spools mimic the size of the bobbin within the partial transformer. After being so wound, the spools of amorphous material are subjected to an annealing operation to relieve bending stresses created by winding the amorphous material onto the smaller spools. Such annealing operations are necessary to ensure maximum magnetic efficiency.

One of the problems with amorphous magnetic core materials is that they may be quite thin, about 0.025 mm thick, which is only one-tenth the thickness of conventional silicon magnetic steel core material. The thinness makes handling the amorphous material more difficult than silicon steel. Also, the currently available amorphous magnetic alloys become brittle, as the result of stress relief annealing operations, which create further problems in handling.

SUMMARY OF THE INVENTION

The present invention is directed to a method and apparatus for winding a ribbon of annealed amorphous magnetic material into a toroidal transformer coil in a manner to minimize damage to the edges of the core material thus minimizing breakage.

A continuous, flat ribbon of amorphous magnetic material is removed from a supply spool and wound into an annular cavity within a partially assembled toroidal transformer. The core material passes from the supply spool, along a guide surface, and through an entrance gap in the partially assembled transformer where it is wound into the annular cavity. An appropriate tension on the material is created by providing a distributed force pulling the ribbon material against the guide surface to create a drag force on the material in the region between the guide surface and the annular cavity The force is preferably created using a magnetic surface as a part of the guide surface.

Slack in the material between the guide surface and the entrance gap can be intermittently created by bulges or eccentricities in the wound-in portion of the core. Such slack can be eliminated by lightly biasing a portion of the guide surface, typically the magnetic surface, against the core material. This elimination of slack is important to reduce breakage of the somewhat fragile annealed amorphous core material by avoiding jerking the ribbon and maintaining a positive, albeit variable, tension on the ribbon during winding-in operations.

The entrance angle of the core material entering the entrance gap may be varied according to the amount of core material wrapped into the annular cavity. One way to do this is to move the support surface relative to the entrance gap. Doing so helps to keep the fragile core material from coming into contact with the windings and leads of the partially assembled transformer as the core is built up.

The core material is preferably subjected to a stress relief annealing operation while it is in the same spiral orientation and with the same inner and outer diameters as the core material will assume as the core of the toroidal transformer. Because of the relatively fragile nature of annealed amorphous core material, pushing the core material from the center of the coil, as taught by the above mentioned U.S. Pat. No. 4,741,484, is not presently feasible. Instead, the annealed core material is unwound from a first spool and wound onto a second, supply spool (the process being called backwinding) so the core material has a reverse spiral orientation on the supply spool. That is, after backwinding the innermost portion of the core material becomes the outermost portion, and vice versa. When the core material is taken from the supply spool and is wound into the bobbin, the proper spiral orientation is achieved with the outermost portion of the core material during annealing being the outermost portion on the bobbin in the partially assembled transformer.

For efficiency, a pair of supply spools are preferably used. Core material is taken from one supply spool and wound into the partially assembled transformer while the other supply spool is being filled (backwound) with core material. This ensures that a supply spool, with its backwound core material thereon, is always available.

Amorphous material is quite thin, approximately 0.025 mm thick, while conventional crystalline grain oriented silicon core steels commonly used with conventional toroidal cores are about 0.18 to 0.30 mm thick. The annealing process makes the amorphous material more brittle so that extra care must be taken to keep from damaging the edges. This is important since a damaged edge acts as a stress concentration site which can result in the core material breaking during backwinding and especially during the core wind-in operation. Breakage of the core material causes time consuming, and thus costly, delays in the manufacturing process.

Recognizing this, one aspect of the present invention uses no edge guides along the path of the core material from the supply spool to the entrance gap. To further reduce the possibility of damage to the core material, the bobbin within the partially assembled transformer should be free of mold flash, burrs, sharp edges along the outer rim of the bobbin flange and anything else which may tend to nick, scrape or otherwise damage the core material. Also, it has been found that great care must be taken when handling a spool of annealed amorphous core material, and especially when mounting a spool of annealed core material onto a pay off spindle in preparation for backwinding the core material onto a supply spool. It has been found that to control any tendency of the core material to telescope off of the spool, which can damage the edges, it is preferred that the pay off spindle be oriented vertically while the spool of annealed core material is mounted onto the pay off spindle. The pay off spindle, with the spool of annealed core material thereon, is then rotated until its axis is horizontal so that the core material can be backwound onto a supply spool.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
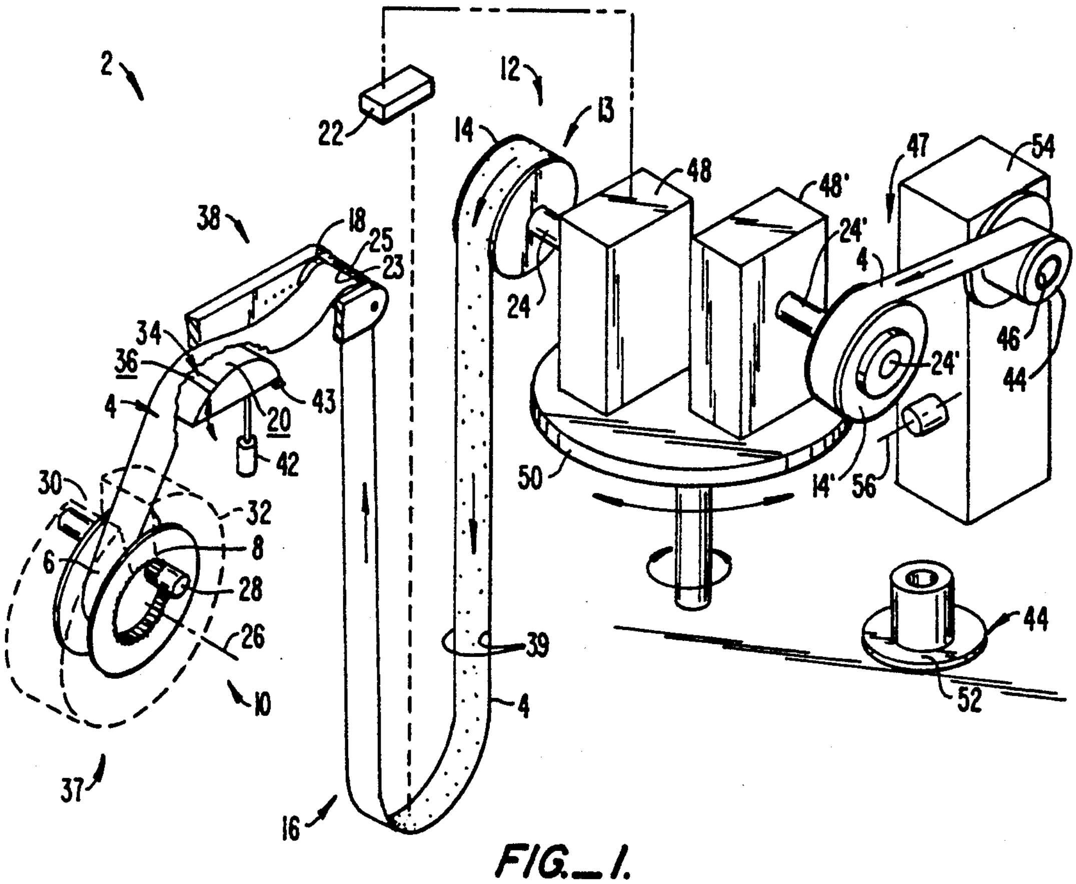
FIG. 1 is a simplified schematic representation illustrating the method and apparatus of the present invention.

Referring now to FIG. 1, an apparatus 2 for winding a ribbon of an amorphous magnetic core material 4 into an annular cavity 6 defined by a bobbin 8 within a partially assembled transformer 1O is shown. A supply 12 of core material 4, located at supply position 13, is wrapped on a rotatable supply spool 14. Core material 4 leaves supply spool 14 and passes along an inventory loop 16, past a guide bar 18 and over a guide surface 20. Guide surface 20 provides an appropriate distributed drag force on core material 4 in the manner discussed below. An ultrasonic position sensor 22, such as that made by Waddington Electronics, Inc. of Cranston. R.I., senses the length of inventory loop 16 so to control the dereeling of supply spool 14 by controlling the speed at which the supply spool spindle 24 is driven. If inventory loop 16 is, for some reason, lost, core material 4 is cut by the saw-toothed lower edge 23 of a tear bar 25 mounted spaced apart from guide bar l8. This prevents a bulge from forming in the wound-in portion of core material 4 within bobbin 8.

Initially an end of core material 4 is secured to bobbin 8 in a conventional manner, such as through the use of a piece of tape. Bobbin 8 is then rotated about its bobbin axis 26 by a bobbin drive 28. Bobbin drive 28 is part of a core wind-in machine substantially similar to that shown in the above mentioned U.S. Pat. No. 4.741.484. It will therefore not be described in detail. Material 4 passes into cavity 6 defined by bobbin 8 through an entrance gap 30 defined by the windings 32 of partially assembled transformer 10.

Maintaining the proper wind-in tension is critical with the present invention. If the tension is too low the resulting material 4 will be too loosely wound with a consequent loss in magnetic properties. If the tension is too great the relatively fragile nature of the annealed amorphous magnetic core material will cause the core material to break during wind-in operations thus slowing down the process. Also, excessive tension can cause the interlaminar contact of core material 4 on transformer 10 to be too intimate which results in a degradation of magnetic properties.

Figure 2:
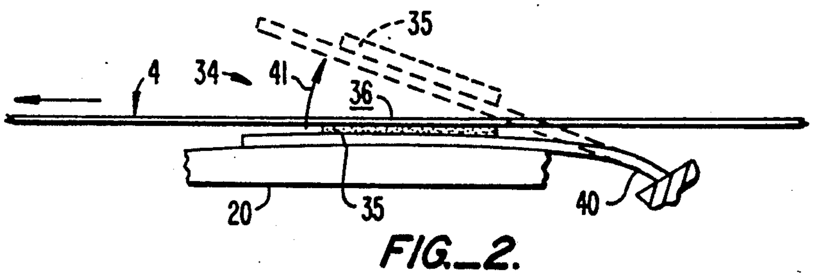
FIG. 2 is a simplified representation showing the resilient mounting of the magnetic surface portion of the guide surface of FIG. 1.

The nature of the annealed amorphous material used as core material 4 requires that the manner in which tension is applied be such as not to damage the core material or create stress concentrations. To accomplish this guide surface 20 is provided with magnetic surface portion 34 which creates a drag on core material 4 as it passes from guide surface 20 to annular cavity 6 of bobbin 8. Magnetic surface portion 34 is created by a smoothly curving permanent magnet 35 (shown in FIG. 2 as flat for simplicity of illustration) having an outer, magnetic drag surface 36 corresponding to the overall curve of surface 20. Magnet 35, in the preferred embodiment, is a rubberized magnet of the type which is commonly available. In the preferred embodiment magnet 35 is about 20 cm wide, by about 3 cm long (measured in the direction of movement of core material 4) and is about 2 mm thick for amorphous core material 4 having a width of about 15 cm. Part of outer surface 36 could be covered with an additional contact film to adjust surface friction and improve surface wear characteristics. For example, a sheet of type 321 stainless steel 0.05 mm thick. commonly called "tool wrap," could be used for its hardness. durability and non-magnetic properties. Magnetic surface portion 34 thus creates both magnetic and frictional drag forces on core material 4 but in a manner which does not create detrimental stress concentration areas and does not otherwise damage core material 4, especially at its edges 39.

As is suggested in FIG. 1, both the core wind-in machine, including bobbin B and the ribbon guide 38, which includes guide surface 20 and guide bar 18, are free of any structure which contacts the edges 39 of core material 4. It has been found that eliminating such edge guide structures, and especially any protrusions, molding flash or other discontinuities along the interior of bobbin 8, helps reduce nicking or other damage to edges 39 thus reducing the cause of breakage of core material 4 during wind-in operations. It has also been found that by careful adjustment of the positions and angles of the various components of supply 12, ribbon guide 38 and core wind-in machine 37, edge guides are not needed. The small lateral excursions of core material 4 which occur have been found to be acceptably small for the finished transformer; permitting the small lateral excursions are believed to reduce stress concentrations which could otherwise be created along the edges of core material 4.

During wind-in of core material 4 into annular cavity 6 of bobbin 8, small eccentricities or other deviations in the wrap of core material 4 onto bobbin 8 may arise. This creates short term, intermittent slack in core material 4 between guide surface 20 and entrance gap 30. Existence of such slack is not desirable because it can impair the uniform wind-in of core material 4; such slack can create bulges in core material 4 in bobbin 8 which prevents winding in the desired amount of core material 4. Such slack can also create much higher than normal stresses on core material 4 when the slack is eliminated by the rotating bobbin.

To help eliminate such slack, a portion of guide surface 20 is very lightly biased away from the direction of movement of core material 4. In the preferred embodiment this is accomplished by mounting magnet 35 to a leaf spring 40 as illustrated schematically in FIG. 2. Leaf spring 40 provides a light biasing force to lightly force surface 36 against core material 4 in a direction 41 and to move core material 4 only when slack is created between guide surface 20 and gap 30. The term light force refers to a force less than that exerted on surface 36 by core material 4 in the direction opposite direction 11 when core material 4 is under the desired tension. Other surfaces could be biased against core material 4 instead of or in addition to surface 36. For example, a counterrotating drum lined with a magnetic tensioning material could be used. Also, a slide-mounted magnetic tensioner lightly biased to move parallel to but opposite the direction of movement of core material 4 could also be used.

During Wind-in of core material 4 into annular cavity 6 of bobbin 8, it may be desired to adjust the angular orientation of core material 4 as it enters entrance gap 30. In the preferred embodiment this is achieved by moving guide surface 20 about a pivot point 43 using an actuator 42. Although the relative orientations between core material 4 and entrance gap 30 can be continuously varied according to the amount of core material built up onto bobbin 8. one adjustment during wind-in operations has been found to be sufficient.

It is preferred that core material 4 be wound in the same spiral direction and orientation on bobbin 8 as it was when it was annealed. To accomplish this, core material 4 is first backwound during a backwinding operation. This involves backwinding of core material 4 from a first spool 44 mounted on a backwinding spindle 46 and onto a second supply spool 14' mounted to a second supply spool spindle 24' at backwind position 47. Spindles 24, 24' and spools 14, 14' are coupled to first and second drives 48, 48', the entire assembly being supported on a rotating platform 50. After supply spool 14 is emptied onto bobbin 8, platform 50 is indexed 180 degrees to position supply spool 14' at supply position 13, which was previously occupied by supply spool 14; supply spool 14' then will act as a part of supply 12 of core material 4. This indexing simultaneously repositions supply spool 14 to backwind position 47, which was previously occupied by spool 14'; for the next backwinding operation.

From FIG. 1 it is seen that first spool 44 has only a single flange 52 as opposed to the dual flanges of spools 14, 14'. The use of a single flange for spool 44 permits better heat transfer to core materials during annealing operations while supplying sufficient rigidity and support for core material 4 during subsequent handling operations. Spools 14, 14' have dual flanges for safety and to contain any accidental telescoping of core material 4.

Figure 3:
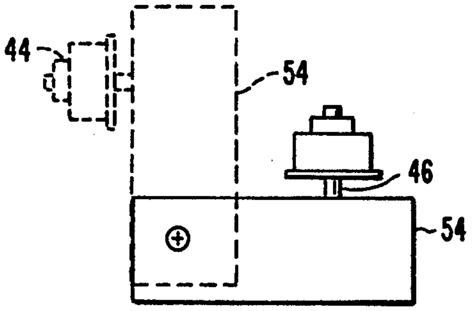
FIG. 3 is a simplified side view of the support column of FIG. 1 shown in a spool mounting position in solid lines with the axis vertical and the backwinding position of FIG. 1, with the axis horizontal, in broken lines.
Figure 1A:
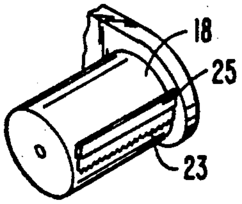

After first spool 44 is empty, spool 44 is removed and a new first spool 44, with core material 4 thereon, is mounted onto backwinding spindle 46. However, since first spools 44 have only a single flange 52, there is a chance for core material 4 to telescope off of first spool 44 during mounting onto spindle 46. Such telescoping invites damage to the edges of core material 4. To help prevent this. backwinding spindle 46 is mounted to a support column 4 which is pivoted about a horizontal axis 56 so that first spindle 46 is either in the horizontal position of FIG. 1 or is pivoted to a vertical position, illustrated in solid lines in FIG. 3. With first spindle 46 arranged vertically and single flange 52 generally horizontal and supporting core material 4, any tendency for core material 4 to telescope off of spool 44 while being mounted onto spindle 6 is eliminated.

In use, the user orients support column 54 to its horizontal position (solid line position of FIG. 3) with first spindle 46 extending vertically. A filled spool 44 is mounted onto first spindle 46 and column 54 is rotated back to its operational position in which first spindle 46 is horizontal. Assuming turntable 50, with drives 48, 48 and spindles 24, 24' thereon, is in the positions of FIG. 1, empty spools 14, 14' are mounted to spindles 24, 24'. A first end of core material 4 from fixed spool 44 is secured to second supply spool 14' and the core material is backwound onto spool 14 . Platform 50 is then indexed 180 degrees to place full supply spool 14' at supply position 13 of FIG. 1. A length of core material 4 is unwound from supply spool 14', passed under tear bar 25, over guide bar 18, across guide surface 20, into annular cavity 6 and is secured to bobbin 8. Bobbin 8 is then driven around its axis 26 by bobbin drive 28 thus pulling core material along a path from supply spool 14', along inventory loop 16. between tear bar 25 and guide bar 18, over guide bar 18, past surfaces 20. 36, through entrance gap 30 and into annular cavity 6. An appropriate tension is maintained between guide surface 20 and entrance gap 30 through the use of a magnetic surface portion 34 of guide surface 20. This method of producing an appropriate drag on core material 4 is very non-damaging to the material. Also, eliminating any edge guide surfaces between supply 12 and entrance gap 30 helps eliminate damage to edges 39 thus reducing breakage of core material 4. During the wind-in operations, supply spool 14 is backwound with core material 4 at backwinding position 47 in the same manner as supply spool 14' was. After supply spool 14' is empty, the process is repeated using core material 4 from supply spool 14.

Modification and variation can be made to the preferred embodiment without departing from the subject of the invention as defined by the following claims. Instead of a single magnet 35, a series of magnets, adjacent one to another or spaced apart, could be used. Electromagnets could be used instead of permanent magnets to permit adjustments to the drag force to be easily made. Also, the drag force could be produced by other, non-magnetic methods, such as using vacuum forces, while permitting relatively small unimpeded lateral excursions of core material 4.

What is claimed is:

1. Apparatus for winding a continuous ribbon of magnetic core material, having lateral edges, into an annular cavity defined by a bobbin within a partial toroidal transformer assembly, the magnetic core material passing through an entrance gap between windings of the partial toroidal transformer assembly and into the annular cavity, the apparatus comprising:

a first spool with a supply of the magnetic core material wound thereon with a first end of the magnetic core material at an inside of the spooled magnetic core material;

a backwinding assembly including:

first and second spindles, the first spindle adapted to receive the first spool, the second spindle adapted to receive a second spool for receipt of the magnetic core material from, the first spool;

means for supporting the first spindle at a horizontal orientation, at which the magnetic material is removed from the first spool, and at a generally vertical orientation, at which the first spool with the magnetic material thereon is mounted on the first spindle; and backwinding means for unwinding the magnetic core material from the first spool and onto the second spool so the first end of the magnetic core material is at an outside of the magnetic core material on the second spool;

a core wind-in machine supporting the partial torodial transformer assembly and the bobbin;

the core wind-in machine including a bobbin drive coupled to the bobbin, which rotates the bobbin within the windings and around an axis of the bobbin;

the magnetic core material extending along a path from the supply through the entrance gap and into the annular cavity so the magnetic core material is wound into the annular cavity by the rotation of the bobbin by the bobbin drive;

a drag surface between the supply and the entrance gap along which the magnetic core material moves; and means for pulling the magnetic core material against the drag surface to supply a distributed drag force on the magnetic core material as it moves to the bobbin.

2. The apparatus of claim 1 wherein the pulling means include a magnet having a magnetic drag surface which defines a portion of the drag surface.

3. The apparatus of claim 1 wherein the magnetic core material is an annealed amorphous magnetic core material.

4. The apparatus of claim 3 wherein the magnetic core material is about 0.025 mm thick.

5. The apparatus of claim 3 wherein the magnetic core material pulling means and core wind-in machine are free of structure which guidably engage the lateral edges of the annealed amorphous magnetic core material so to help prevent damage to said lateral edges by permitting lateral excursions of the magnetic core material.

6. The apparatus of claim 1 wherein the magnetic core material is about 0.18 mm to about 0.30 mm thick.

7. The apparatus of claim 1 wherein at least a portion of the drag surface is positioned and configured to direct the magnetic core material toward the entrance gap at a chosen orientation relative to the entrance gap.

8. The apparatus of claim 7 further comprising means for changing the chosen orientation.

9. The apparatus of claim 8 wherein the orientation changing means includes means for pivoting the drag surface.

10. The apparatus of claim 1 further comprising means for supportably positioning a plurality of said second spindles and second spools therewith, said second spindles and second spools being movable between a backwinding position, at which the magnetic core material is wound onto the second spool thereat, and a supply position, at which the second spindle and spool with the magnetic core material thereon constitutes said supply of the magnetic core material.

11. The apparatus of claim 1 wherein the path includes an inventory loop segment between the supply and the drag surface.

12. The apparatus of claim 11 further comprising means coupled to the supply of magnetic core material, for controlling the size of the inventory loop.

13. The apparatus of claim 1 wherein the drag surface includes means for dynamically maintaining tension on the magnetic core material along the portion of the path between the drag surface and the entrance gap.

14. The apparatus of claim 13 wherein the tension maintaining means includes a resilient mounting member lightly biasing a tensioning surface in a chosen direction against the magnetic core material, the chosen direction being a direction other than the direction of movement of the magnetic core material at the tensioning surface, so that a temporary slacking of the magnetic core material allows the tensioning surface to move the magnetic core material to take up stack in the magnetic core material.

15. Apparatus for winding a continuous ribbon of magnetic core material, having lateral edges, into an annular cavity defined by a core bobbin within a partial torodial transformer assembly, the magnetic core material passing through an entrance gap between windings of the partial torodial transformer assembly and into the annular cavity, the apparatus comprising:

a first spool with an annealed magnetic core material wound thereon with a first end of the magnetic core material at an inside of the spooled magnetic core material;

a backwinding assembly including:

first and second spindles, the first spindle adapted to receive the first spool, the second spindle adapted to receive a second spool for receipt of the magnetic core material from the first spool;

means for supporting the first spindle at a horizontal orientation, at which the magnetic material is removed from the first spool, and at a generally vertical orientation, at which the first spool with the magnetic material thereon is mounted on the first spindle; and means for unwinding the magnetic core material from the first spool and onto the second spool with the first end of the magnetic core material at an outside of the magnetic core material on the second spool;

a core wind, in machine supporting the partial toroidal transformer assembly and the core bobbin;

the core wind in machine including a bobbin drive coupled to the bobbin, which rotates the bobbin within the windings and around an axis of the bobbin;

the magnetic core material extending along a path from the supply through the entrance gap and into the annular cavity so the magnetic core material is wound into the annular cavity by the rotation of the bobbin by the bobbin drive;

a ribbon guide between the supply and the entrance gap, the ribbon guide having a guide surface along which the magnetic core material moves;

the ribbon guide including a magnet having a magnetic drag surface which defines a portion of the guide surface to supply a distributed drag force on the magnetic core material as it moves past the ribbon guide and to the bobbin;

the ribbon guide and core wind-in machine being free of structure which guidably engage the lateral edges of the magnetic core material, to permit lateral excursions of the magnetic core material, so to help prevent damage to said lateral edges; and the ribbon guide including means for dynamically maintaining tension on the magnetic core material along the portion of the path between the guide surface and the entrance gap, the tension maintaining means including a movable mounting member carrying at least a part of the guide surface, the movable mounting member lightly biasing the guide surface part against the direction of movement of the magnetic core material so that a temporary slacking of the magnetic core material allows the guide surface part to move the magnetic core material to take up slack in the magnetic core material.

16. The apparatus of claim 15 further comprising means for supportably positioning a plurality of said second spindles and second spools therewith, said second spindles and a second spools being movable between a backwinding position, at which the magnetic core material is wound onto the second spool thereat, and a supply position, at which the second spindle and spool with the magnetic core material thereon constitutes said supply of the magnetic core material.

17. A method for winding a ribbon of magnetic core material, having lateral edges, into an annular cavity of a rotatable bobbin, the bobbin within a partially assembled toroidal transformer assembly, the transformer assembly having an entrance gap through which the magnetic core material enters the annular cavity, the method comprising:

mounting a first spool, holding the magnetic core material wound in a spiral orientation thereon, onto a generally vertical first spindle and then reorienting the first spindle, with the first spool thereon, to a horizontal position;

backwinding the magnetic core material from the first spool onto a second spool to create a supply of the magnetic core material;

directing the magnetic core material along a path from the supply of the magnetic core material, past a drag surface, through the entrance gap and into the annular cavity;

rotating the bobbin to pull the magnetic core material into the annular cavity, the magnetic core material, when wound into the annular cavity of the bobbin, exhibiting said spiral orientation; and pulling the magnetic core material against the drag surface thereby creating a distributed drag force on the magnetic core material.

18. Th e method of claim 12 wherein the pulling step is carried out by magnetically urging the magnetic ribbon material agains tthe drag surface.

19. The method of claim 17 wherein the directing step is carried out using a spool of the magnetic core material.

20. The method of claim 17 wherein the directing step is carried out using an arcuate ribbon guide which includes the drag surface.

21. The method of claim 17 further comprising the step of adjusting an orientation of the magnetic core material as it enters the entrance gap according to how much of the magnetic core material has been wound into the annular cavity.

22. The method of claim 17 further comprising the step of reducing slack in the magnetic core material between the drag surface and the entrance gap by lightly biasing a guide surface against the magnetic core material passing thereby.

23. The method of claim 22 wherein the guide surface includes the drag surface.

24. The method of claim 17 wherein the directing step is carried out using an annealed amorphous magnetic material.

25. The method of claim 24 further comprising the step of avoiding contact with the lateral edges of the magnetic core material between said supply and said entrance gap to help prevent breakage of the magnetic core material.

26. The method of claim 17 further comprising the step of permitting some lateral excursions of the magnetic core material between said supply and said entrance gap to help prevent breakage of the magnetic core material.

27. A method for winding a ribbon of annealed amorphous magnetic core material, having lateral edges, into an annular cavity of a rotatable bobbin, the bobbin within a partially assembled toroidal transformer assembly, the transformer assembly having an entrance gap through which the magnetic core material enters the annular cavity, the method comprising:

mounting a first spool, holding magnetic core material wound in a spiral orientation thereon, onto a generally vertical first spindle and then reorienting the first spindle, with the first spool thereon, to a horizontal position;

backwinding the magnetic core material from the first spool onto a second spool to create a supply of the magnetic core material;

directing the magnetic core material along a path from the supply of said magnetic core material, against a guide surface of an arcuate ribbon guide, through the entrance gap and into the annular cavity;

rotating the core bobbin to pull the magnetic core material into the annular cavity, the magnetic core material, when wound into the annular cavity of the bobbin, exhibiting said spiral orientation;

magnetically urging the magnetic core material against a first portion of the guide surface thereby creating a distributed drag force on the magnetic core material as it moves past the guide surface portion;

reducing slack in the magnetic core material between the ribbon guide and the entrance gap by lightly biasing a second portion of the surface of the ribbon guide against the magnetic core material passing thereby; and avoiding contact with the lateral edges of the magnetic core material between said supply and said entrance gap, and permitting some lateral excursions of the magnetic core material between said supply and said entrance gap, to help prevent breakage.

28. The method of claim 27 further comprising the step of adjusting or orientation of the magnetic core material entering the entrance gap according to how much of the magnetic core material has been wound into the annular cavity.

* * * * *